United States Patent [19]
Koike et al.

[11] Patent Number: 5,635,903
[45] Date of Patent: Jun. 3, 1997

[54] SIMULATED SOUND GENERATOR FOR ELECTRIC VEHICLES

[75] Inventors: Makoto Koike; Masashi Kitagawa; Kazunari Ishiguro, all of Wako, Japan

[73] Assignee: Honda Giken Kogyo Kabushiki Kaisha, Tokyo, Japan

[21] Appl. No.: 360,304

[22] Filed: Dec. 21, 1994

[30] Foreign Application Priority Data

Dec. 21, 1993 [JP] Japan ................... 5-322276

[51] Int. Cl.[6] ............... B60Q 1/00; G08B 3/00
[52] U.S. Cl. ............ 340/441; 340/692; 340/384.1; 340/384.3; 446/397; 381/86
[58] Field of Search ............... 340/384.3, 384.1, 340/384.4, 384.5, 692, 441; 446/397, 409; 381/57, 61, 86; 434/48, 49; 273/85 R, 317.1

[56] References Cited

U.S. PATENT DOCUMENTS

| | | | |
|---|---|---|---|
| 3,845,572 | 11/1974 | McCanney | 35/11 |
| 4,219,962 | 9/1980 | Dankman et al. | 46/232 |
| 4,265,047 | 5/1981 | Meyer et al. | 46/232 |
| 4,946,416 | 8/1990 | Stern et al. | 446/409 |
| 5,204,971 | 4/1993 | Takahashi et al. | 381/86 |

FOREIGN PATENT DOCUMENTS

| | | |
|---|---|---|
| 56-166701 | 12/1981 | Japan. |
| 56-171501 | 12/1981 | Japan. |

*Primary Examiner*—Donnie L. Crosland
*Attorney, Agent, or Firm*—Lyon & Lyon LLP

[57] ABSTRACT

Based on detected information from a start sensor, a rotational speed sensor (or a vehicle speed sensor), and an accelerator opening sensor, a simulated sound selector device controls a simulated sound source device to generate a simulated sound signal corresponding to an operating condition of an electric vehicle when it starts, runs and is accelerated or decelerated, and also controls a sound level switcher device to adjust the level of the simulated sound signal. The simulated sound signal which is generated by the simulated sound source device and adjusted in level by the sound level switcher device is amplified by amplifiers, which drive respective loudspeakers to produce simulated sounds. The sound level switcher device is also controlled based on an ambient noise level detected by a noise sensor.

15 Claims, 7 Drawing Sheets

20 SIMULATED SOUND SOURCE

OUTPUT SIGNAL 21a FROM OSCILLATOR 21

OUTPUT SIGNAL 22a FROM OSCILLATOR 22

OUTPUT SIGNAL FROM ADDER

OUTPUT SIGNAL FROM MODULATOR

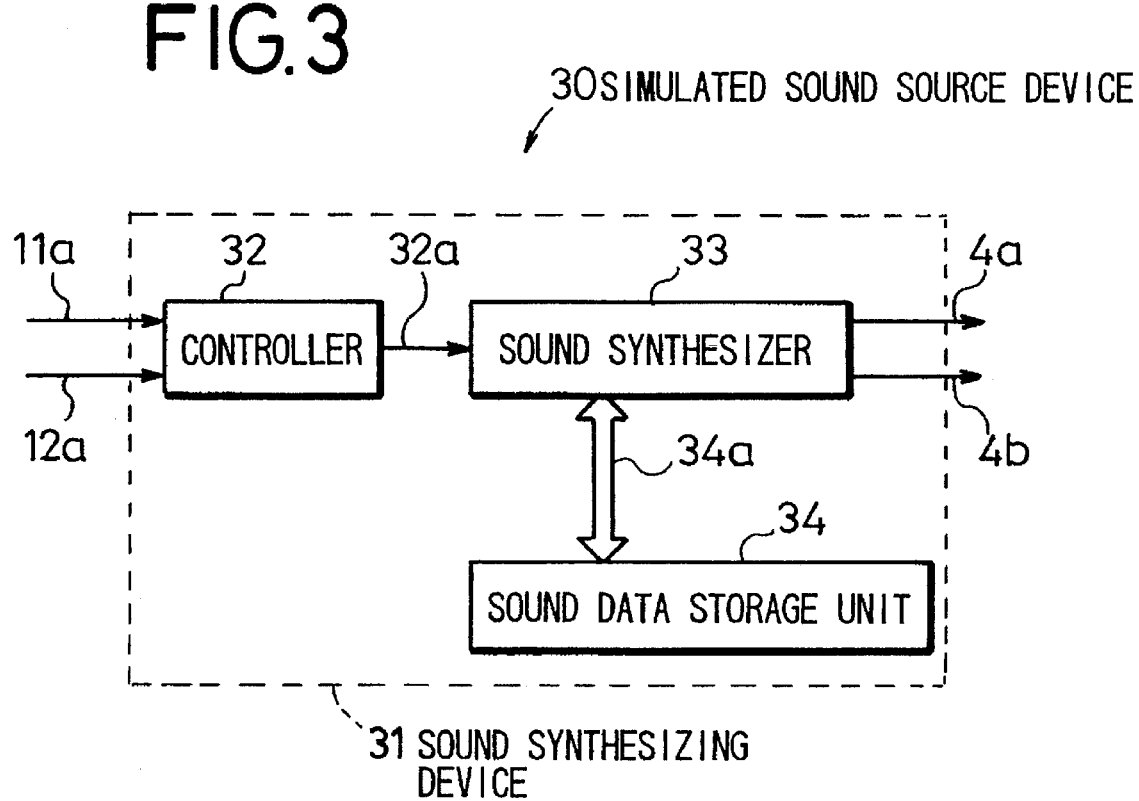

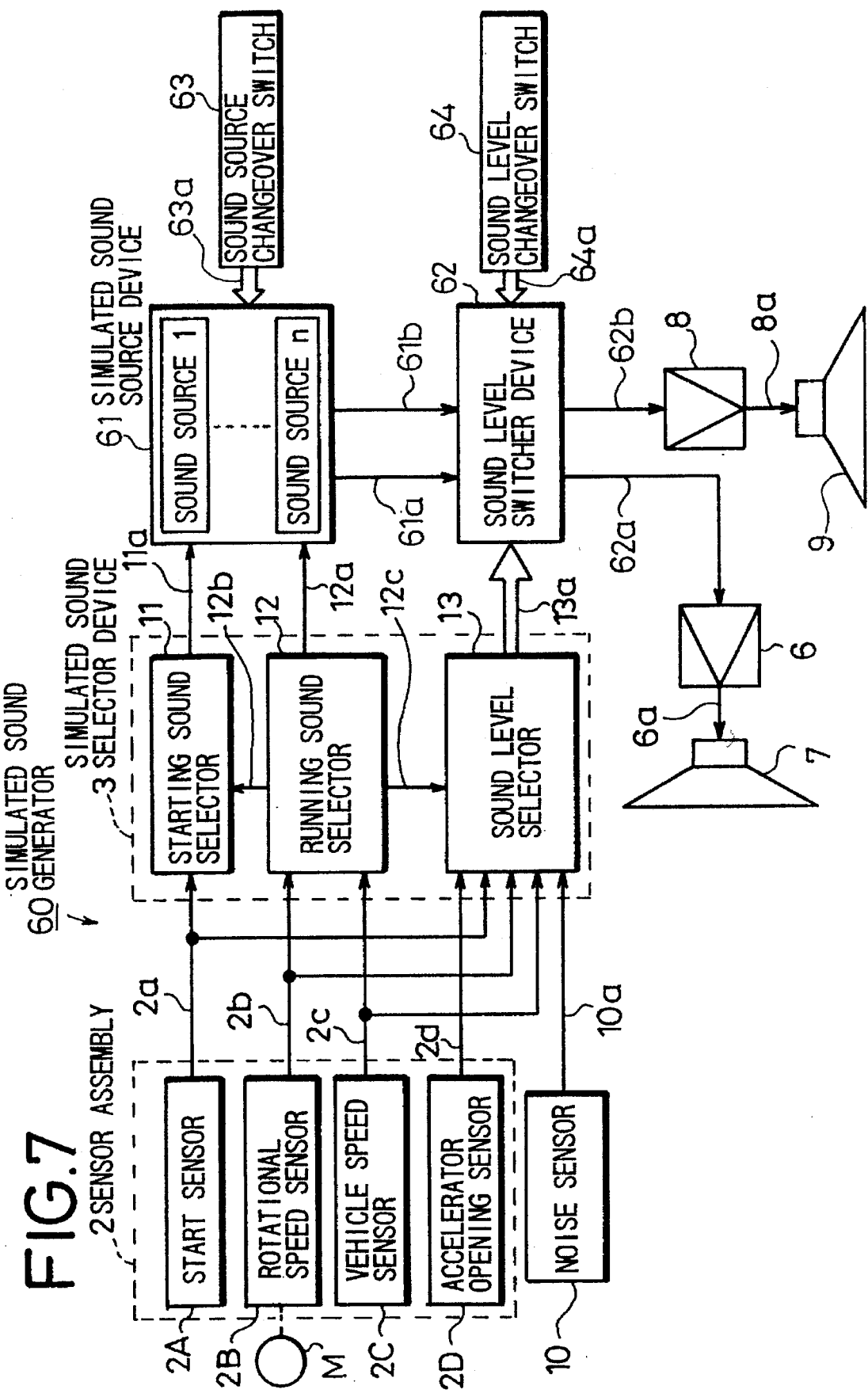

SIMULATED SOUND GENERATOR FOR ELECTRIC VEHICLES

BACKGROUND OF THE INVENTION

1. Field of the Invention

The present invention relates to a simulated sound generator for use in an electric vehicle, that generates artificial sounds which are similar to sounds generated by gasoline-powered automobiles at the time they start, run and are accelerated and decelerated, taking ambient noises into account.

2. Description of the Related Art

Conventional pseudosound generators for electric vehicles as disclosed in Japanese laid-open utility model publications Nos. 56-166701 and 56-171501 produce different alarm sounds when the electric vehicle moves forward and backward, respectively, or produce different alarm sounds corresponding to vehicle speeds of forward and backward movement of the electric vehicle.

The known pseudosound generators have an alarm sound source which comprises a multivibrator for generating a pulsed signal. The pseudosound generators produce different sounds by varying the frequency or duty factor (pulse duration) of pulses generated by the multivibrator.

Therefore, the sounds produced by the known pseudosound generators are relatively simple and hence suitable for use as alarm sounds. The conventional pseudosound generators are, however, not suitable for producing sounds which indicate various operating conditions of the electric vehicle to the driver and other people around the vehicle because the pseudosounds produced by the pseudosound generators are greatly different from those produced by gasoline-powered automobiles.

The gasoline-powered automobiles produce engine sounds when the engine is idling at the time they are at rest, and the electric vehicles make no sounds at the time they are at rest as the electric motor of the power unit is de-energized. Consequently, the gasoline-powered automobiles and the electric vehicles differ widely from each other with respect to the manner in which they produce sounds.

SUMMARY OF THE INVENTION

It is therefore an object of the present invention to provide a simulated sound generator for producing simulated sounds for an electric vehicle which are similar to sounds produced when gasoline-engine vehicles start, run and are accelerated and decelerated, thereby to let the driver and nearby pedestrians know operating conditions of the electric vehicle.

According to the present invention, the above object can be achieved by a simulated sound generator for use in an electric vehicle comprising a start sensor for detecting a starting of the electric vehicle, a speed sensor for detecting a running speed of the electric vehicle, an accelerator opening sensor for detecting an accelerator opening of the electric vehicle, a simulated sound selector device for outputting simulated sound selection information based on starting information from the start sensor, speed information from the speed sensor, and accelerator opening information from the accelerator opening sensor, a simulated sound source device for producing a simulated sound based on the simulated sound selection information from the simulated sound selector device, and a sound level switcher device for selecting a sound level of the simulated sound from the simulated sound source device based on the starting information, the speed information, and the accelerator opening information, whereby simulated sounds depending on operating conditions of the electric vehicle can be produced.

The simulated sound generator may further include a noise sensor for detecting ambient noise, the sound level switcher device being controllable based on noise information from the noise sensor for varying the level of the simulated sound depending on the ambient noise.

The simulated sound generator can generate simulated sounds suitable for various operating conditions of the electric vehicle at the time when it starts, runs and is accelerated and decelerated.

With the noise sensor added, the generated simulated sounds may be varied depending on the ambient noise which is detected by the noise sensor.

Therefore, the driver of the electric vehicle and nearby pedestrians can recognize the various operating conditions of the electric vehicle at the time when it starts, runs and is accelerated and decelerated, with the generated simulated sounds, and hence can respond in the same manner as with gasoline-powered automobiles.

Since the simulated sounds are automatically adjusted in level depending on the ambient noise, the simulated sound generator can reduce simulated sounds at night and in quiet places.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a block diagram of another simulated sound source unit for use in the simulated sound generator shown in FIG. 1;

FIG. 7 is a block diagram of a simulated sound generator for an electric vehicle according to another embodiment of the present invention.

DETAILED DESCRIPTION OF THE PREFERRED EMBODIMENTS

Figure 1:
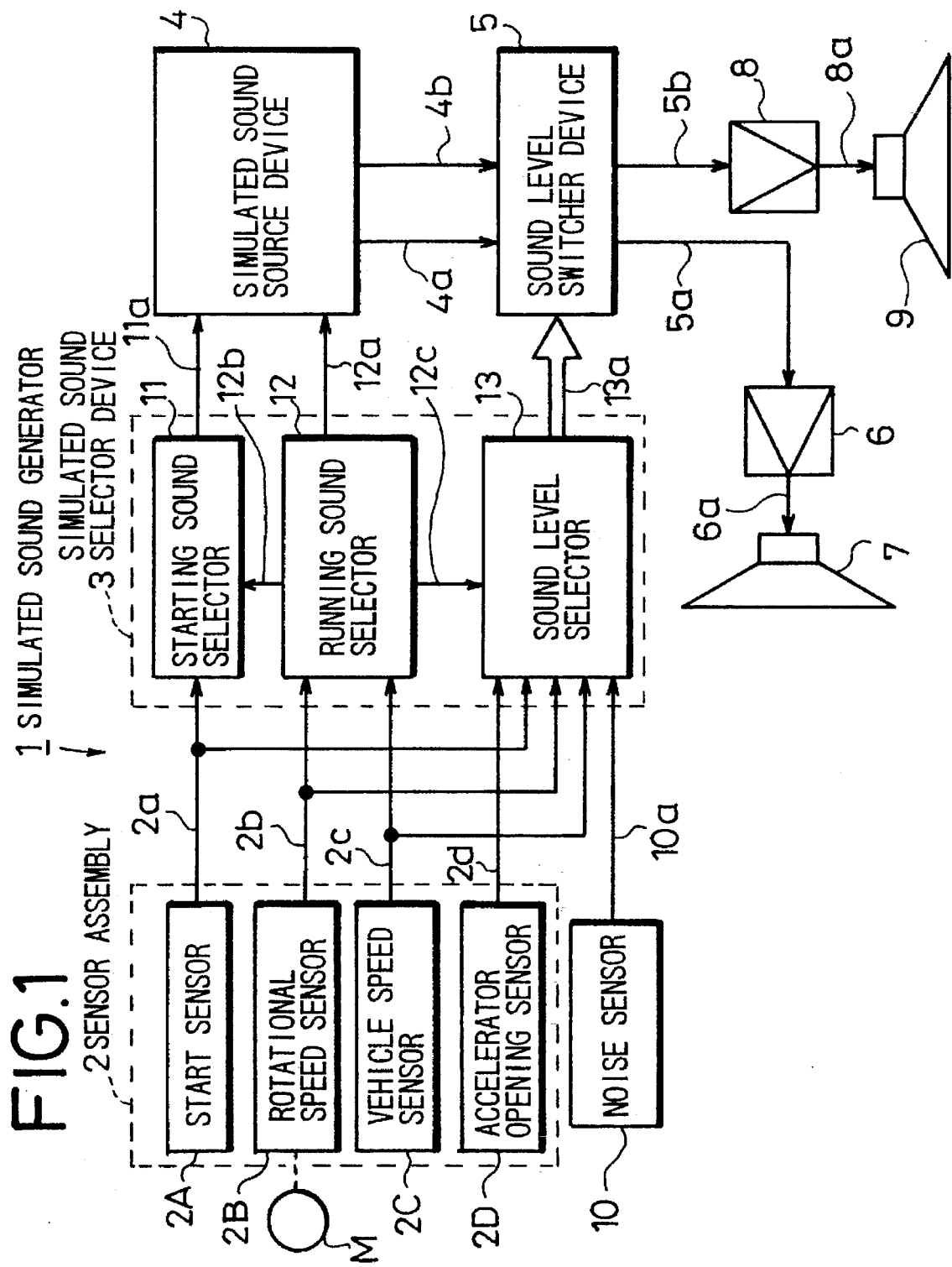
FIG. 1 is a block diagram of a simulated sound generator for an electric vehicle according to an embodiment of the present invention.

As shown in FIG. 1, a simulated sound generator 1 for an electric vehicle according to an embodiment of the present invention comprises a sensor assembly 2, a simulated sound selector device 3, a simulated sound source device 4, a sound level switcher device 5, a pair of audio-frequency amplifiers 6, 8, a pair of loudspeakers 7, 9, and a noise sensor 10. The loudspeaker 7 is disposed outside of the electric vehicle, and the loudspeaker 9 is disposed inside of the electric vehicle.

The simulated sound selector device 3, the simulated sound source device 4, the sound level switcher device 5 are controlled by a microprocessor (not shown), or each is partly or wholly comprised of a microprocessor.

The sensor assembly 2 comprises a start sensor 2A, a rotational speed sensor 2B, a vehicle speed sensor 2C, and an accelerator opening sensor 2D.

When the driver of the electric vehicle operates a starter switch, an ignition switch, and a shift position switch on the electric vehicle, the start sensor 2A detects that the electric vehicle has started, generates a start (S) signal 2a, and sends the start (S) signal 2a to the simulated sound selector device 8. The starter switch and the ignition switch are named after the corresponding switches on a motor vehicle powered by an internal combustion engine. When the starter switch is turned on, the accessories on the electric vehicle are energized. When the ignition switch is turned on, an electronic circuit for controlling the drive motor of the electric vehicle is energized. When these switches are turned on, the electric vehicle is readied for running.

The start sensor 2A may be a voltage detector for detecting a voltage which is applied to the simulated sound generator 1 when a vehicle key is operated and generating a detected signal, or a switch which can be actuated when the vehicle key is operated, e.g., turned.

There are two types of starting of the electric vehicle. According to one type, the starter switch is turned on and the ignition switch is turned on, and the shift position switch is turned from a P (parking) position or an N (neutral) position to move the electric vehicle from a rest position. According to the other type, the ignition switch is turned on and the shift position switch is turned to a D (driving) position or an R (reverse) position, or a brake switch is turned off, or an accelerator switch is turned on to move the electric vehicle from a temporarily stopped position. The start sensor 2A detects these two types of starting, and sends a start (S) signal 2a depending on one of the two types of starting to the simulated sound selector device 3.

The start (S) signal 2a is representative of a predetermined voltage or current level.

The rotational speed sensor 2B detects the rotational speed (N) of a wheel drive motor M of the electric vehicle, and sends a rotational speed (N) signal 2b to the simulated sound selector device 3.

The rotational speed sensor 2B is arranged such that the rotational speed (N) signal 2b is a voltage or current signal representative of the rotational speed of the wheel drive motor M, the rotational speed signal 2b being of either a positive level when the electric vehicle moves forward and of a negative level when the electric vehicle moves backward, or a level which increases from a predetermined level when the electric vehicle moves forward and decreases therefrom when the electric vehicle moves backward.

The rotational speed sensor 2B may be replaced with the vehicle speed sensor 2C which detects the vehicle speed (V) of the electric vehicle which is correlated to the rotational speed (N) of the wheel drive motor M.

The vehicle speed sensor 2C detects the vehicle speed (V) of the electric vehicle, and sends a vehicle speed (V) signal 2c to the simulated sound selector device 3.

While use of the rotational speed sensor 2B will be described below, the description also applies to the vehicle speed sensor 2C.

The accelerator opening sensor 2D detects an accelerator opening (X), and sends an accelerator opening (X) signal 2d to the simulated sound selector device 3.

The accelerator opening (X) signal 2d may be a voltage or current signal representative of the detected accelerator opening (X).

As described above, the sensor assembly 2 detects the starting (S) of the electric vehicle, the rotational speed (N) of the wheel drive motor M (or the vehicle speed (V) of the electric vehicle), and the accelerator opening (X), and outputs electric signals (voltage or current signals) indicative of the detected quantities, respectively.

The simulated sound selector device 3 has a starting sound selector 11, a running sound selector 12, and a sound level selector 13. Based on the various signals from the sensor assembly 2, the simulated sound selector device 3 controls the selection of starting and running sounds for the electric vehicle which are to be generated by the simulated sound source device 4, and also controls the selection in the sound level switcher device 5 for changing sound levels of starting and running sounds.

In response to the start (S) signal 2a from the start sensor 2A, the starting sound selector 11 outputs two types of starting sound selection information 11a to the simulated sound source device 4, and selects a sound preset as a starting sound.

The starting sound selector 11 is arranged to generate the starting sound selection information 11a having a format corresponding to the arrangement of the simulated sound source device 4. Specifically, the starting sound selection information 11a is of a format depending on the arrangement of the simulated sound source device 4 which may comprise a oscillator having a simple frequency output, a sound synthesizer, or a digital signal processor (DSP), for example, and is information representing turning on/off of a voltage or a current, or digital bit information.

The starting sound selector 11 may be arranged as part of the running sound selector 12.

In response to the rotational speed (N) signal 2b from the rotational speed sensor 2B, the running sound selector 12 supplies the simulated sound source device 4 with running sound selection information 12a corresponding to the voltage or current level of the rotational speed (N) signal 2b.

The running sound selector 12 is arranged to generate the running sound selection information 12a having a format corresponding to the arrangement of the simulated sound source device 4. Specifically, the running sound selection information 12a is also of a format depending on the arrangement of the simulated sound source device 4 which may comprise a oscillator having a simple frequency output, a sound synthesizer, or a digital signal processor (DSP), for example, and is information representing turning on/off of a voltage or a current, or digital bit information.

The running sound selector 12 sends a sound selection stop signal 12b to the starting sound selector 11 or sends a sound level selection stop signal 12c to the sound level selector 13 to stop the starting sound when the electric vehicle has started running.

In response to the start (S) signal 2a, the rotational speed (N) signal 2b, and the accelerator opening (X) signal 2c from the sensor assembly 2, or detected noise information 10a from the noise sensor 10, the sound level selector 13 sends sound level switching information 13a to the sound level switcher device 5 to control sound level switching of simulated sounds depending on the starting of the electric vehicle, the rotational speed of the wheel drive motor (vehicle speed), the accelerator opening (acceleration/ deceleration) and the ambient noise.

The simulated sound source device 4 is a sound source for producing simulated sounds corresponding to the starting, running (forward or backward), and acceleration/ deceleration of the electric vehicle. The simulated sound source device 4 may be in the form of a simple oscillator, a combination of oscillators, a combination of an oscillator or oscillators and a modulator for producing modified sounds, a sound synthesis IC for recording, synthesizing, and outputting sounds produced when a gasoline-powered automobile starts, runs, and is accelerated/decelerated, or a digital signal processor (DSP) for calculating and processing signals to produce desired sound signal waves.

The simulated sound source device 4 sends starting sound signals or running sound signals 4a, 4b to the sound level switcher device 5 based on the starting sound selection information 11a from the starting sound selector 11 or the running sound selection information 12a from the running sound selector 12.

Figure 2A:
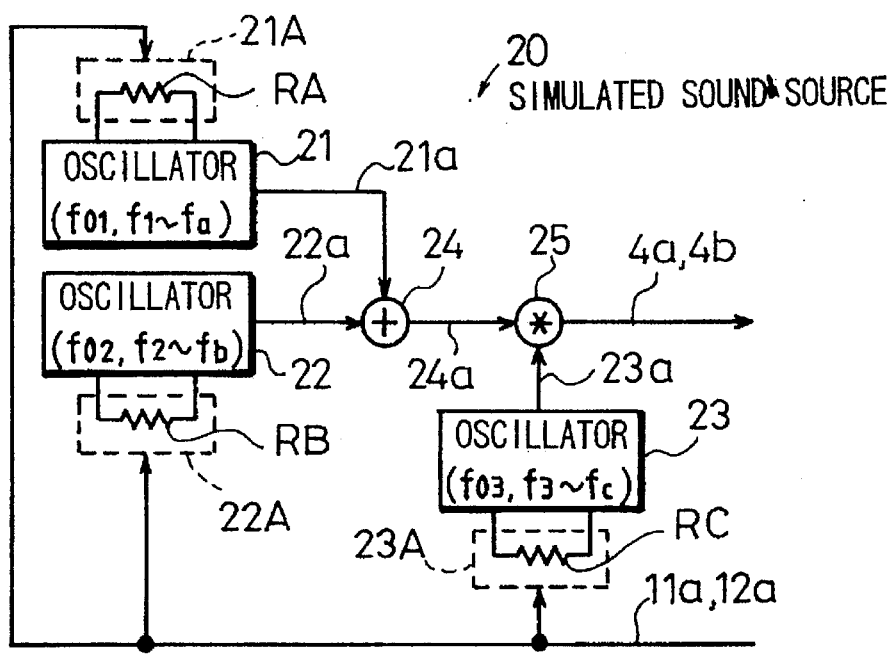
FIG. 2A is a block diagram of a simulated sound source unit for use in the simulated sound generator shown in FIG. 1.

FIG. 2A shows in block form a simulated sound source 20 for use as the simulated sound source device 4 in the simulated sound generator 1.

As shown in FIG. 2A, the simulated sound source 20 has variable-frequency oscillators 21, 22, 23, an adder 24, and a modulator 25. The variable-frequency oscillators 21, 22, 2S are associated with respective resistor groups 21A, 22A, 23A for changing oscillation frequencies.

When the electric vehicle has started and the starting sound selector 11 in the simulated sound selector device 8 produces starting sound selection information 11a, the variable-frequency oscillators 21, 22, 2S select respective resistances RA, RB, RC from the resistor groups 21A, 22A, 23A based on the starting sound selection information 11a, oscillate at respective frequencies fo1, fo2, fo3, and output respective oscillated output signals 21a, 22a, 23a.

The oscillated output signals 21a, 22a from the variable-frequency oscillators 21, 22 are added to each other by the adder 24, which supplies a dual-frequency sum signal 24a to the modulator 25.

Since the modulator 25 is supplied with the oscillated output signal 23a from the variable-frequency oscillator 23, the modulator 25 amplitude-modulates the sum signal 24a with the oscillated output signal 23a, and outputs a modulated signal as the starting sound signal 4a or 4b to the sound level switcher device 5.

Figure 2B:
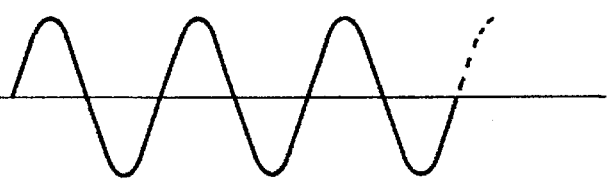
FIG. 2B is a diagram showing the waveform of an output signal from an oscillator in the simulated sound source unit shown in FIG. 2A.
Figure 2C:
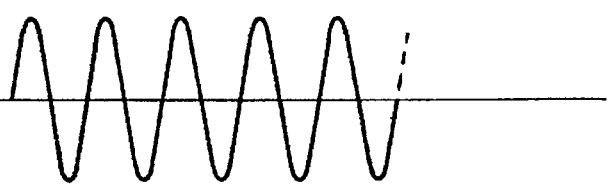
FIG. 2C is a diagram showing the waveform of an output signal from another oscillator in the simulated sound source unit shown in FIG. 2A.
Figure 2D:
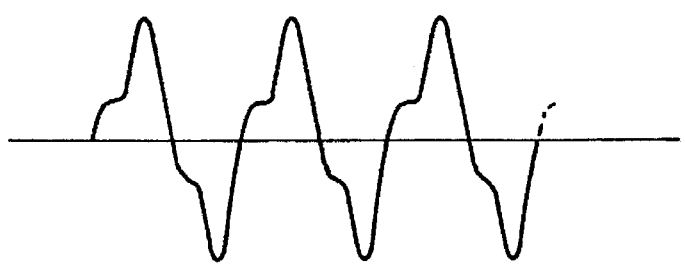
FIG. 2D is a diagram showing the waveform of an output signal from an adder in the simulated sound source unit shown in FIG. 2A.
Figure 2E:
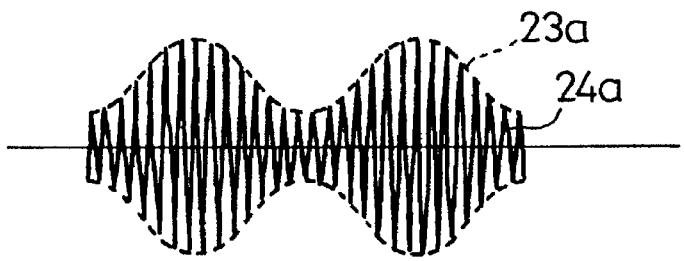
FIG. 2E is a diagram showing the waveform of an output signal from a modulator in the simulated sound source unit shown in FIG. 2A.

FIGS. 2B through 2E show the waveforms of the output signals respectively from the variable-frequency oscillators 21, 22, the adder 24, and the modulator 25. Specifically, FIG. 2B shows the waveform of the oscillated output signal 21a from the variable-frequency oscillator 21, and FIG. 2C shows the waveform of the oscillated output signal 22a from the variable-frequency oscillator 22. FIG. 2D shows the waveform of the sum signal 24a from the adder 24, and FIG. 2E shows the waveform of the modulated output signal from the modulator 25.

The variable-frequency oscillators 21, 22, 23 are arranged to output sine-wave signals in the illustrated embodiment. However, the variable-frequency oscillators 21, 22, 23 may be arranged to output rectangular-wave signals, or the waveform of the sum signal 24a from the adder 24 may be distorted to produce fundamental and harmonic components.

As shown in FIG. 2E, the modulator 25 comprises an amplitude modulator in the illustrated embodiment. However, the modulator 25 may comprise a frequency modulator or a phase modulator for producing different sounds.

Two sets of the arrangement shown in FIG. 2A are provided to produce the starting sound signals 4a, 4b so that different starting sounds are generated outside and inside, respectively, of the electric vehicle. If the same starting sound is generated outside and inside of the electric vehicle, then only one of the starting sound signals 4a, 4b may be generated, and hence only one set of the arrangement shown in FIG. 2A is required.

When the electric vehicle runs, the variable-frequency oscillators 21, 22, 23 select respective resistances RA, RB, RC from the resistor groups 21A, 22A, 23A based on the running sound selection information 12a from the running sound selector 12, oscillate at respective frequencies f1 through fa, f2 through fb, f3 through fc, respectively, depending on the level of the running sound selection information 12a, and output oscillated output signals 21a, 22a, 23a, respectively.

The frequencies f1 through fa, f2 through fb, f3 through fc are set such that they become higher as the speed of travel of the electric vehicle (corresponding to the rotational speed of the wheel drive motor M) increases.

The output signals produced respectively from the variable-frequency oscillators 21, 22, the adder 24, and the modulator 25 at this time have respective waveforms as shown in FIGS. 2B through 2E.

FIG. 3 shows in block form another simulated sound source 30 for use as the simulated sound source device 4 in the simulated sound generator 1.

As shown in FIG. 3, the simulated sound source 30 comprises a sound synthesizing device 31 having a controller 32, a sound synthesizer 33, and a sound data storage unit 34.

The sound data storage unit 34 comprises a memory such as a masked ROM or the like. Sound data are stored in the storage unit 34 as follows: Starting sounds (engine sounds) of a gasoline-powered automobile and running sounds produced thereby when it runs and is accelerated and decelerated are recorded, and the recorded sounds are processed by way of analysis or the like. The processed sounds are then stored as sound data in the sound data storage unit 34.

Based on the starting sound selection information 11a from the starting sound selector 11 or the running sound selection information 12a from the running sound selector 12, the controller 32 supplies a drive signal 32a to the sound synthesizer 33. In response to the drive signal 32a, the sound synthesizer 33 transfers information 34a to and receives information 34a from the sound data storage unit 34, and synthesizes sound data stored in the sound data storage unit 34 to produce starting and running sound signals.

The synthesized starting and running sound signals are close to actual sounds produced by a gasoline-powered automobile because they are produced based on the starting and running sounds of the gasoline-powered automobile.

The controller 82, the sound synthesizer 33, and the sound data storage unit 34 of the simulated sound source 30 may comprise respective ICs or a hybrid IC (HIC) composed of ICs. If few sound data are present, then the controller 32, the sound synthesizer 33, and the sound data storage unit 34 may be in the form of a one-chip microprocessor (CPU).

The simulated sound source device 4 may comprise a digital signal processor (DSP) capable of generating desired signal waveforms, so that it can reproduce the starting and running sounds of a gasoline-powered automobile or produce simulated sounds suitable for use as the starting and running sounds of an electric vehicle.

The sound level switcher device 5 controls the level of the starting or running sound signals 4a, 4b from the simulated sound source device 4 based on the sound level switching information 13a from the sound level selector 13, and transmits simulated sound signals 5a, 5b respectively to the audio-frequency amplifiers 6, 8.

Figure 4A:
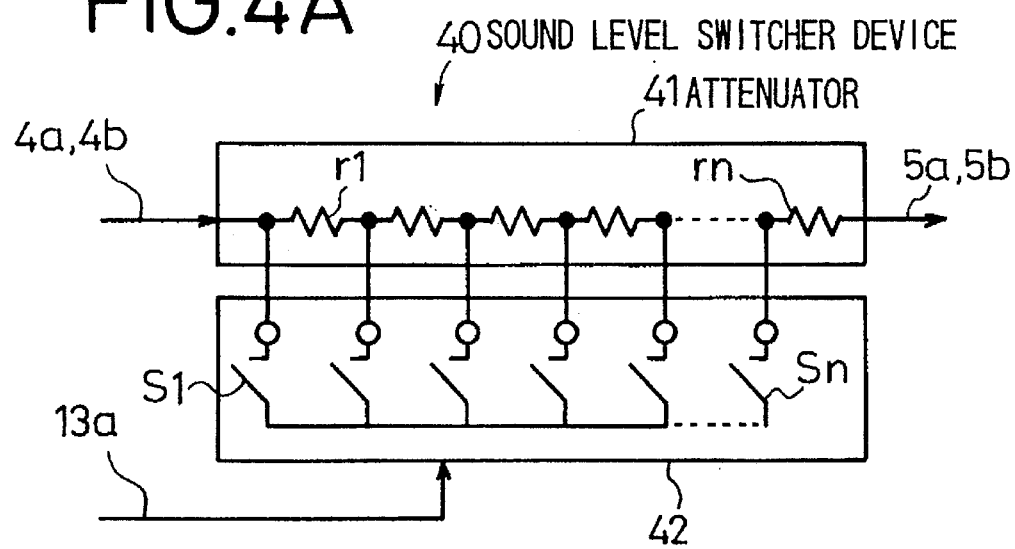
FIG. 4A is a circuit diagram of a sound level switcher for use in the simulated sound generator shown in FIG. 1.

FIG. 4A shows a sound level switcher 40 for use as the sound level switcher device 5 in the simulated sound generator 1 shown in FIG. 1.

As shown in FIG. 4A, the sound level switcher 40 comprises an attenuator 41 composed of resistors r1 through rn and a selector switch assembly 42 composed of switches s1 through sn for shunting the resistors r1 through rn.

Based on the sound level switching information 13a from the sound level selector 13, the selector switch assembly 42 turns on selected ones of the switches s1 through sn. The turned-on switches determine the level of attenuation of the attenuator 41 thereby to attenuate the starting or running sound signals 4a, 4b from the simulated sound source device 4. The sound level switcher 40 then transmits simulated sound signals 5a, 5b based on the attenuated starting or running sound signals 4a, 4b respectively to the low-frequency output amplifiers 6, 8.

The switches s1 through sn of the selector switch assembly 42 comprise electronic switches which can selectively be turned on based on either the voltage or current level of the sound level switching information 13a or the digital binary level of the sound level switching information 13a.

Figure 4B:
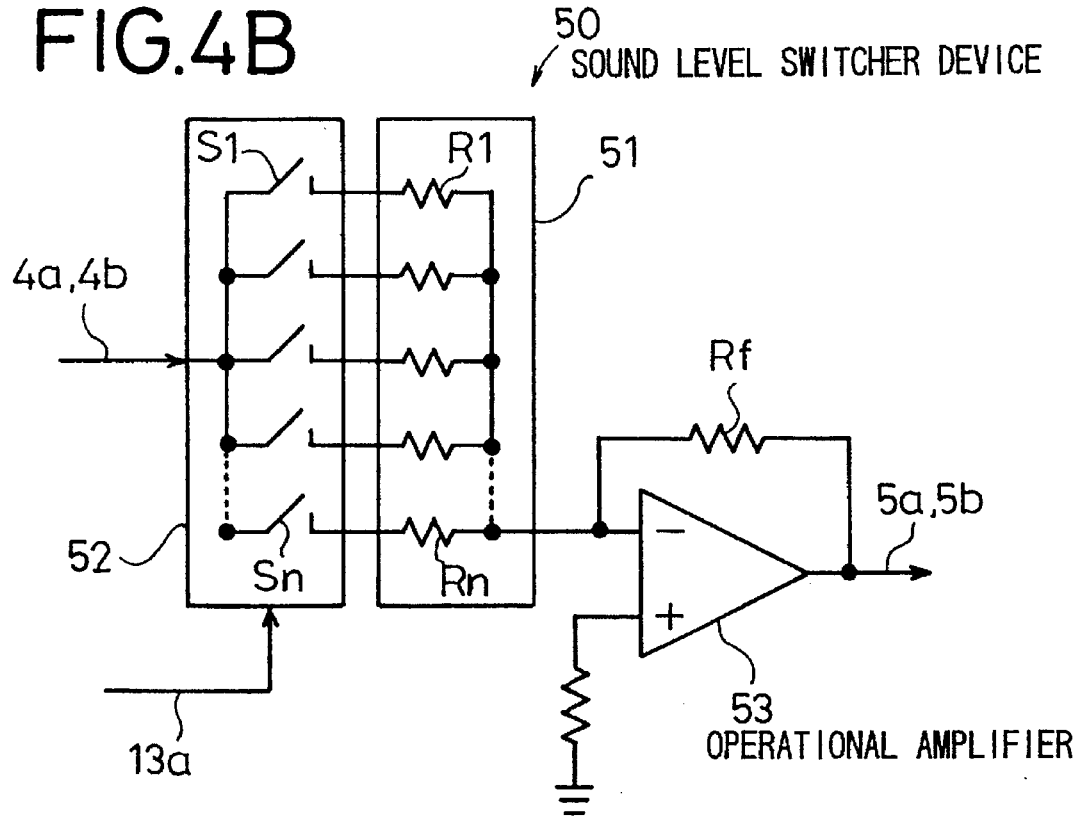
FIG. 4B is a circuit diagram of another sound level switcher for use in the simulated sound generator shown in FIG. 1.

FIG. 4B shows another sound level switcher device 50 for use as the sound level switcher device 5 in the simulated sound generator 1 shown in FIG. 1.

As shown in FIG. 4B, the sound level switcher device 50 comprises a resistor group 51 composed of resistors R1 through Rn, a selector switch assembly 52 composed of switches s1 through sn, and an operational amplifier 53, and serves as an inverting amplifier.

Since the input impedance of the operational amplifier 53 is composed of the resistor group 51, it is possible to determine the level of attenuation (or the level of amplification) of the sound level switcher device 50 with the ratio of a feedback resistor Rf to the resistor group 51 (Rf/R1 through Rf/Rn).

If, for example, the switch S1 is turned on to connect the resistor R1 as an input resistor to the operational amplifier 53, then the level of the simulated sound signals 5a, 5b is attenuated (or amplified) Rf/R1 times the level of the starting or running sound signals 4a, 4b.

The selector switch assembly 52 is of the same arrangement as the selector switch assembly 42 shown in FIG. 4A.

In FIG. 1, the audio-frequency amplifiers 6, 8 amplify the simulated sound signals 5a, 5b outputted from the sound level switcher device 5, and supply respective amplified simulated sound signals 6a, 8a to the respective loudspeakers 7, 9, which radiate simulated sounds outside and inside, respectively, of the electric vehicle.

Figure 5A:
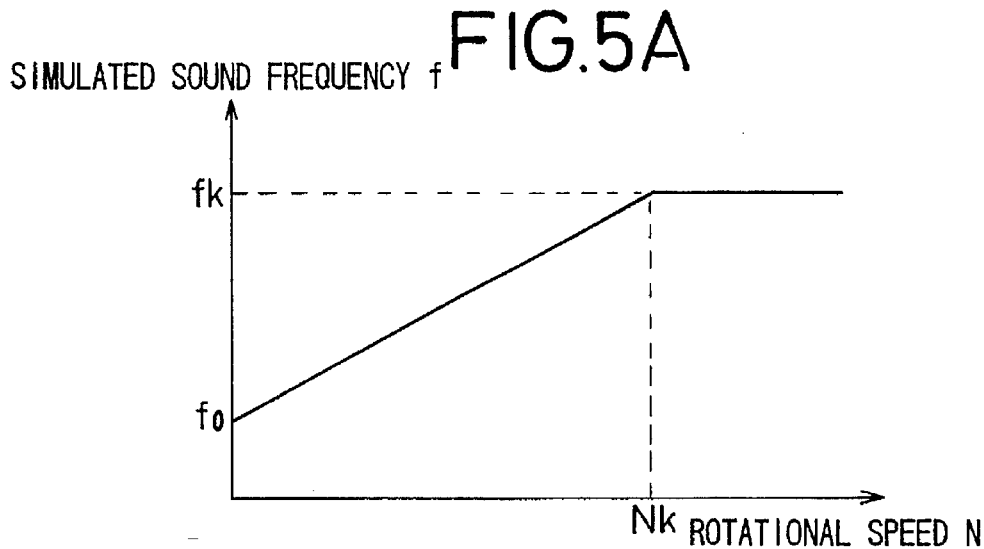
FIG. 5A is a diagram showing frequency characteristics of simulated sounds produced by the simulated sound generator shown in FIG. 1.
Figure 5B:
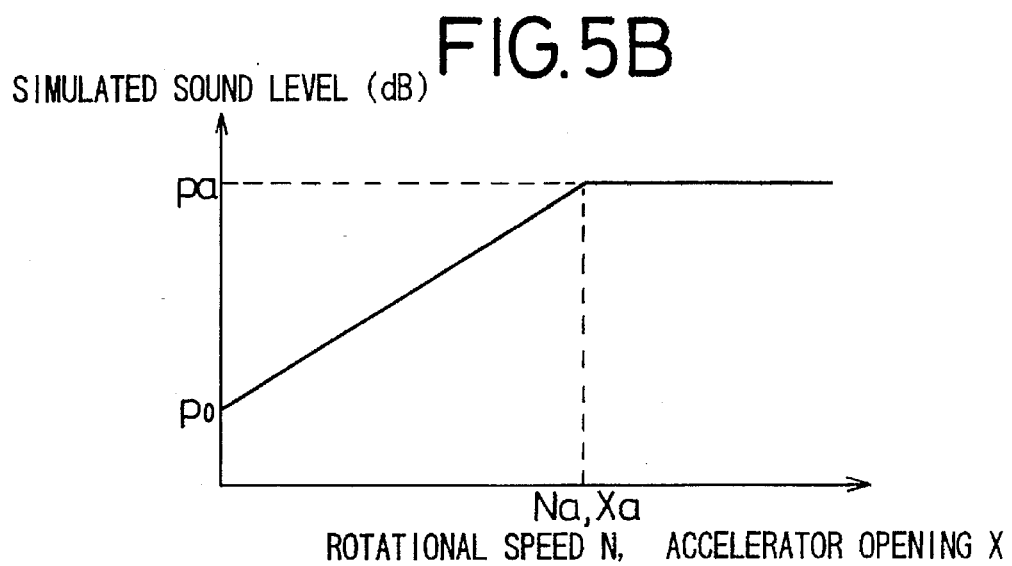
FIG. 5B is a diagram showing sound level characteristics of simulated sounds produced by the simulated sound generator shown in FIG. 1.
Figure 5C:
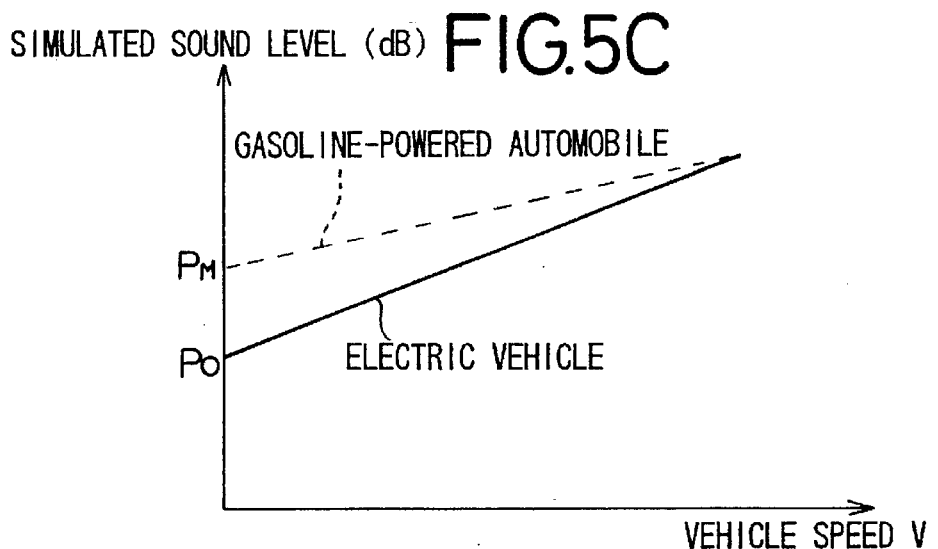
FIG. 5C is a diagram showing sound level characteristics of simulated sounds produced by the simulated sound generator shown in FIG. 1.

FIGS. 5A through 5C show frequency and sound level characteristics of simulated sounds produced by the simulated sound generator shown in FIG. 1.

Specifically, FIG. 5A shows the relationship of a simulated sound frequency f to the rotational speed N of the wheel drive motor M, FIG. 5B the relationship of a simulated sound level P to the rotational speed N of the wheel drive motor M and the accelerator opening X, and FIG. 5O the relationship of the simulated sound level P to the vehicle speed V.

In FIG. 5A, when the rotational speed N is zero (N=0), i.e., when the wheel drive motor M is not energized and the driver of the electric vehicle has just operated the vehicle key to start the electric vehicle, the simulated sound frequency f of starting sounds is of (f=of).

As the electric vehicle has started running and the rotational speed N of the wheel drive motor M increases, the simulated sound frequency f of running sounds increases in proportion to the rotational speed N. When the rotational speed N exceeds a predetermined level Nk, the simulated sound frequency f is maintained at a constant value fk (f=fk).

In FIG. 5B, when the electric vehicle has just started and the rotational speed N is zero (N=0), the simulated sound level P of starting sounds is Po (dB). As the electric vehicle has started running, the simulated sound level P increases in proportion to the rotational speed N. When the rotational speed N exceeds a predetermined level Na, the simulated sound level P is maintained or saturated at a constant value Pa (P=Pa). The simulated sound level P represents the level of the simulated sound signals 5a, 5b.

The simulated sound level P with respect to the accelerator opening X increases in proportion to the accelerator opening X, but is not saturated.

FIG. 5C illustrates the sound levels of the electric vehicle and a gasoline-powered automobile with respect to the vehicle speed V. The sound level of the gasoline-powered automobile increases gradually from a level $P_M$ in proportion to the vehicle speed V. On the other hand, the simulated sound level of the electric vehicle increases progressively from a level Po in proportion to the vehicle speed V, progressively reducing the difference with the sound level of the gasoline-powered automobile.

As described above with reference to FIGS. 5A through 5C, the simulated sound frequency f and the simulated sound level P increase linearly in proportion to the rotational speed N, the accelerator opening X, and the vehicle speed V. However, the simulated sound frequency f and the simulated sound level P may increase along curves other than linear curves to produce suitable running sounds of the electric vehicle.

Figure 6:
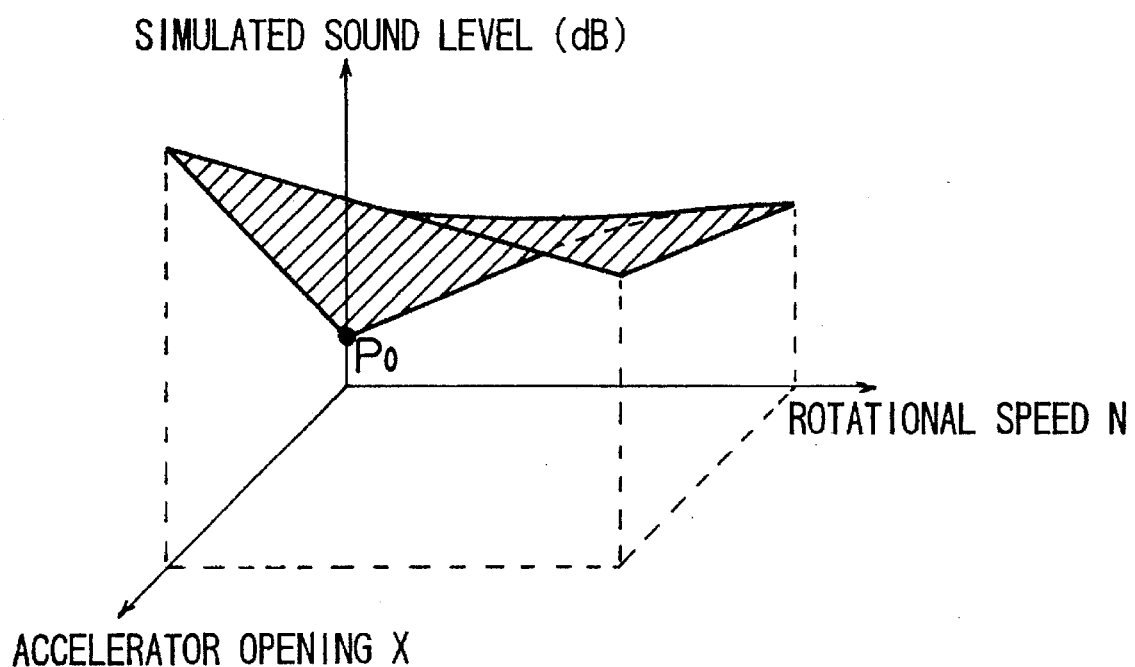
FIG. 6 is a diagram showing sound level characteristics of simulated sounds produced by the simulated sound generator shown in FIG. 1.

FIG. 6 shows sound level characteristics of simulated sounds produced by the simulated sound generator shown in FIG. 1. In FIG. 6, the level P of produced simulated sounds is plotted three-dimensionally with respect to the rotational speed N of the wheel drive motor M and the accelerator opening X of the electric vehicle.

When the rotational speed N and the accelerator opening X are zero, the simulated sound level P is Po, and the electric vehicle starts to move. When the electric vehicle runs, various simulated sounds upon acceleration and deceleration of the electric vehicle can be produced based on a combination of the rotational speed N and the accelerator opening X.

The noise sensor 10 (see FIG. 1) comprises a microphone (not shown) for detecting ambient noise, a logarithmic amplifier (not shown) for amplifying the detected noise in a wide level range, e.g., from 60 phons to 100 phons, into noise in a predetermined range, and a converter for converting an output signal from the logarithmic amplifier into a DC current, voltage level or a digital bit code. The noise sensor 10 outputs detected-noise information 10a representative of a DC level or a bit code converted from the ambient noise level to the sound level selector 13.

Since the detected-noise information 10a increases or decreases depending on the ambient noise level, the sound level selector 13 and the sound level switcher device 5 cause the loudspeakers 7, 9 to produce simulated starting and running sounds at a sound level depending on the ambient noise.

The control of the level of simulated sounds is arranged such that the level of simulated starting sounds and simulated running sounds including accelerator-operated acceleration and deceleration is increased or reduced depending on the ambient noise.

The level of simulated starting sounds and simulated running sounds including accelerator-operated acceleration and deceleration is shifted vertically in FIG. 6, i.e., increased or reduced depending on the ambient noise. When the ambient noise is larger, the level of the simulated sounds is shifted upwardly, i.e., increased, and when the ambient noise is smaller, the level of the simulated sounds is shifted downwardly, i.e., reduced.

The loudspeaker 7 positioned outside of the electric vehicle is installed on the bottom of the body of the electric vehicle. Alternatively, two loudspeakers 7 may be mounted on front and rear portions, respectively, of the body of the electric vehicle to produce simulated sounds at a substantially equal level around the electric vehicle. The loudspeaker 9 positioned inside of the electric vehicle is installed in a location which allows the driver to hear simulated sounds produced thereby without being annoyed. The microphone for detecting the noise is installed in a position spaced from the loudspeaker 7 so that any adverse effect which the simulated sounds produced from the loudspeaker 7 have on the microphone will be minimized.

FIG. 7 shows in block form a simulated sound generator 60 for an electric vehicle according to another embodiment of the present invention.

As shown in FIG. 7, the simulated sound generator 60 has a sensor assembly 2, a simulated sound selector device 3, a simulated sound source device 61 composed of a plurality of sound sources 1 through n, a sound source changeover switch 63 for selecting one of the sound sources 1 through n manually by the driver of the electric vehicle, a sound level switcher device 62, a sound level changeover switch 64 for selecting one of plural sound levels manually by the driver of the electric vehicle, a pair of low-frequency output amplifiers 6, 8, a pair of loudspeakers 7, 9, and a noise sensor 10. The sensor assembly 2, the simulated sound selector device 3, the low-frequency output amplifiers 6, 8, the loudspeakers 7, 9, and the noise sensor 10 are identical to those shown in FIG. 1.

Each of the sound sources 1 through n of the simulated sound source device 61 has the same arrangement as the simulated sound source device 4 shown in FIG. 1 for producing simulated sounds. When the sound source changeover switch 63 is manually operated by the driver, one of the sound sources 1 through n is selected which corresponds to switch information 63a from the sound source changeover switch 63, and the selected sound source supplies starting or running sound signals 61a, 61b to the sound level switcher device 62.

As with the simulated sound source device 4, each of the sound sources 1 through n of the simulated sound source device 61 is controlled by the starting sound selection information 11a from the starting sound selector 11 or the running sound selection information 12a from the running sound selector 12.

The sound level switcher device 62 comprises the attenuator 41 shown in FIG. 4A or the resistor group 51 shown in FIG. 4B, and resistor groups connected in series or parallel to or in series-parallel to the attenuator 41 or the resistor group 51. When the sound level changeover switch 64 is manually operated by the driver, one of the resistor groups is selected which corresponds to a switch signal 64a from the sound level changeover switch 64 to determine a sound level, and simulated sound signals 62a, 62b are supplied at the determined sound level to the low-frequency output amplifiers 6, 8.

Since the simulated sound generator 60 has the simulated sound source device 61 and the sound level switcher device 62 which are manually operable by the driver, the driver can manually operate the simulated sound source device 61 and the sound level switcher device 62 through the sound source changeover switch 63 and the sound level changeover switch 64, respectively, to enable the simulated sound generator 60 to produce simulated sounds of desired sound quality and level.

Although certain preferred embodiments of the present invention has been shown and described in detail, it should be understood that various changes and modifications may be made therein without departing from the scope of the appended claims.

What is claimed is:

1. A simulated sound generator for use in an electric passenger vehicle in which motive power for the vehicle is supplied by electricity comprising:

an electrically powered drive motor for driving wheels of the electric vehicle;

a start sensor for detecting starting of the electric vehicle and ignition operation of said drive motor;

a speed sensor for detecting a running speed of the electric vehicle;

an accelerator opening sensor for detecting a degree of opening of an accelerator of the electric vehicle;

a simulated sound selector device for outputting simulated sound selection information based on starting information from said start sensor, speed information from said speed sensor and accelerator degree of opening information from said accelerator opening sensor;

a simulated sound source device for producing a simulated sound based on the simulated sound selection information from said simulated sound selector device; and a sound level switcher device for selecting a sound level of the simulated sound from said simulated sound source device based on said starting information, said speed information and said accelerator degree of opening information, wherein simulated sounds depending on operating conditions of the electric vehicle are produced.

2. A simulated sound generator according to claim 1, further comprising a noise sensor for detecting ambient noise, said sound level switcher device being controllable based on noise information from said noise sensor for varying the level of the simulated sound depending on the ambient noise.

3. A simulated sound generator according to claim 1, wherein said speed sensor comprises a rotational speed sensor for detecting a rotational speed of a rotor of a wheel drive motor of the electric vehicle.

4. A simulated sound generator according to claim 1, wherein said simulated sound selector device includes a starting sound selector for transmitting, to said simulated sound source device, starting sound selection information as said simulated sound selection information in response to said starting information for enabling said simulated sound source device to produce a simulated starting sound based on the starting information.

5. A simulated sound generator according to claim 1, wherein said simulated sound selector device includes a running sound selector for transmitting, to said simulated sound source device, running sound selection information as said simulated sound selection information in response to said speed information for enabling said simulated sound source device to produce a simulated running sound based on the speed information.

6. A simulated sound generator according to claim 1, wherein said simulated sound source device comprises a sound synthesizing device for generating a starting simulated sound based on the simulated sound selection information from said simulated sound selector device responsive to the starting information, and a running simulated sound based on the simulated sound selection information from said simulated sound selector device responsive to the speed information.

7. A simulated sound generator according to claim 1, wherein said simulated sound source device comprises at least three variable-frequency oscillators, an adder for adding oscillated output signals from the variable-frequency oscillators except one variable-frequency oscillator, and a modulator for modulating an output signal from said adder with an oscillated output signal from said one variable-frequency oscillator, all said variable-frequency oscillators having respective oscillation frequencies independently selectable based on the simulated sound selection information from said simulated sound selector device for separately generating simulated starting and running sounds.

8. A simulated sound generator according to claim 7, wherein said modulator comprises an amplitude modulator.

9. A simulated sound generator according to claim 7, wherein said modulator comprises a frequency modulator.

10. A simulated sound generator according to claim 1, wherein said sound level switcher device comprises a variable-attenuation attenuator having a level of attenuation controllable based on said starting information, said speed information, and said accelerator opening information.

11. A simulated sound generator according to claim 1, wherein said sound level switcher device comprises an inverting amplifier having a gain controllable based on said starting information, said speed information, and said accelerator opening information.

12. A simulated sound generator according to claim 1, further comprising a first loud speaker inside the electric vehicle and a second loud speaker outside the electric vehicle for separately producing said simulated sound inside and outside of the electric vehicle.

13. A simulated sound generator for use in an electric passenger vehicle in which motive power for the vehicle is supplied by electricity comprising:
 an electrically powered drive motor for driving wheels of the electric vehicle;
 sensor means for sensing a plurality of operating conditions of the electric vehicle and said drive motor; and
 simulated sound producing means for producing simulated sounds corresponding to actual sounds of an internal combustion engine driven vehicle operating at said plurality of operating conditions sensed by said sensor means.

14. A simulated sound generator according to claim 13, further comprising a sound level switcher for selecting a sound level of the simulated sounds based on said plurality of operating conditions sensed by said sensor means.

15. A simulated sound generator according to claim 14, further comprising a noise sensor for detecting ambient noise, said sound level switcher being controllable based on noise information from said noise sensor for varying the level of the simulated sounds depending on the ambient noise.

* * * * *